United States Patent [19]

Jensen

[11] Patent Number: 5,012,343

[45] Date of Patent: Apr. 30, 1991

[54] CCD DELTA-MODULATION FOCAL PLANE

[75] Inventor: William E. Jensen, San Pedro, Calif.

[73] Assignee: The United States of America as represented by the Secretary of the Air Force, Washington, D.C.

[21] Appl. No.: 461,516

[22] Filed: Dec. 29, 1989

[51] Int. Cl.$^5$ .................... H04N 3/14; H04N 5/335
[52] U.S. Cl. .................... 358/213.11; 358/213.31; 358/213.15
[58] Field of Search ............ 358/213.31, 213.15, 358/213.11

[56] References Cited

U.S. PATENT DOCUMENTS

| | | | |
|---|---|---|---|
| 3,808,435 | 4/1974 | Bate et al. | 250/332 |
| 4,064,533 | 12/1977 | Lampe et al. | 358/105 |
| 4,300,163 | 11/1981 | Wada et al. | 358/213.15 |
| 4,400,728 | 8/1983 | Long | 358/358 |
| 4,488,778 | 12/1984 | Polzer et al. | 350/631 |
| 4,497,066 | 1/1985 | Gasparri, Jr. | 382/48 |
| 4,573,177 | 2/1986 | Petrosky | 377/60 |
| 4,620,231 | 10/1986 | Kosonocky | 358/213.31 |
| 4,710,816 | 12/1987 | Yabumoto | 358/213.15 |
| 4,783,842 | 11/1988 | Fuwa | 358/213.15 |

*Primary Examiner*—James J. Groody
*Assistant Examiner*—Wendy R. Greening
*Attorney, Agent, or Firm*—William G. Auton; Donald J. Singer

[57] ABSTRACT

A focal plane array for scanned imaging systems provides an increased dynamic range by encoding analog differences between scene pixel amplitudes at a detector unit cell. Charge Coupled Device (CCD) differentiators are utilized to encode the pixel deltas at the unit cell. These deltas are summed and transmitted in time delay and integration fashion with a CCD readout register. DC sense edge detector information is read out independently of the register AC signals, and thus provides a level from which to begin integration of the pixel deltas. The DC and AC scene information are contained in the reconstructed video.

3 Claims, 3 Drawing Sheets

CCD DELTA-MODULATION FOCAL PLANE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to scanned imaging systems, and more particularly to a charge coupled device (CCD) focal plane array used to encode, time delay and integrate scene image deltas.

Video data acquisition systems typically store received video images in a computer memory, as well as present them on a display. The total image is digitally stored in terms of horizontal projection counts of the image pixels, and vertical projection counts of the image lines. Prior art scanned imaging systems are disclosed in the following U.S. patents, the disclosures of which are incorporated herein by reference:
U.S. Pat. No. 4,497,066 issued to A. Gasparri, Jr.;
U.S. Pat. No. 4,400,728, issued to D. Long; and
U.S. Pat. No. 4,488,778, issued to S. White.

The Gasparri reference discloses a video data acquisition system which digitizes picture images of an article and selects signals within a predetermined amplitude range as representations of pixels of the picture image. The Long reference discloses a video process control system for identifying, inspecting, or measuring machined parts or the like in which each part is placed in the viewing field of a video camera. The White reference discloses an apparatus for determining the spatial coordinates of a workpiece within the field of view of the apparatus.

While the video systems of the above-cited references are exemplary in the art, they are subject to dynamic range limitations. The dynamic range of standard focal plane register arrays is typically from 50 dB to 70 dB. The present invention was intended to provide a video image signal processing system which uses charge coupled devices as the readout portion a focal plane array to increase the dynamic range of scanned imaging systems.

Charge coupled devices are used in electronic circuits to sample analog input signals to provide a series of analog bits to be stored in potential wells created at the surface of a semiconductor and transported along the surface by timing signals. More particularly, these charges constitute minority carriers stored at the silicon-silicon dioxide interface of non-memory capacitors and are transferred from the capacitor to a capacitor or well on the same substrate by manipulating the voltages applied across the capacitor. An excellent example of an electronic use of charge coupled devices is disclosed in U.S. Pat. No. 4,573,177 issued to Kenneth J. Petrosky, the disclosure of which is incorporated by reference.

The use of CCD technology has been adapted to imaging systems as disclosed in U.S. Pat. No. 3,808,435 issued to R. Bate et al; and U.S. Pat. No. 4,064,533 issued to D. Lampe et al, the disclosures of which are incorporated herein by reference. The Bate et al reference discloses a scanned image processing circuit using a charge coupled device and charge transfer device multiplexer. The Lampe et al reference discloses a focal plane processor for moving target imaging which takes two time-displaced snapshots of a scene and then differences the signal levels of corresponding elemental areas of the two snapshots to produce an output representative of the difference.

While the art cited above is instructive, the need remains for a signal processing system which reduces the dynamic range limitations of scanned imaging systems which may occur due to the analog differences between scene pixel amplitudes. The present invention is intended to satisfy that need.

SUMMARY OF THE INVENTION

The present invention is a focal plane array for scanned imaging systems which provides an increased dynamic range by encoding analog differences between scene pixel amplitudes at the detector unit cell. One embodiment of the invention is used in combination with a scanned imaging system and entails: several columns of MOD TDI columns which consists of a DC detector, columns of scanned detectors, a column of CCD differentiators, and an integrating well.

The DC detector receives the initial information or pixel from an image of a scanned imaging system. The DC detectors produce an output signal that establishes the first pixel amplitudes for the scanned image.

The array of scanned detectors receives signals from the image which is scanned across the detectors. The scanned detectors output a signal representing scene pixel amplitudes.

The array of CCD differentiators receive a "fat zero" from the integrating well and the output signals from the array of scanning detectors. The column of CCD differentiators serves as a TDI register which produces charge output signals which encode the amplitude differences between pixels for that column. The charge output signals of the CCD differentiators are transferred to the integrating well (which produces the "fat zero") and to the display system of the scanned imaging system in the manner discussed below.

A CCD allows only unipolar signals (charge) to be applied and propagated through it, so any bipolar signals must be offset by some "fat zero" to make it unipolar. For many signal processing applications, it is desirable to reconstruct a true DC signal from the shifted output. Dark current generation which is a function of temperature and clock rate, prevents one from simply subtracting out a known DC constant. Techniques which have been used to overcome this problem include the operation of 2 parallel CCDs, one with a (REF+SIGNAL) and the other with a (REF−SIGNAL), and subtracting the two voltage outputs.

The array of CCD differentiators in the present invention receives the "fat zero" charges ($Q_{FZ}$) from the integrating well and the output signals from the array of scanned detectors ($\Delta Q$). As mentioned above, the column of CCD differentiators serves as a register which produces charge output signals ($Q_R$) which equal $Q_{FZ} \pm \Delta Q$. The charge output signals represent the amplitude differences between pixels for each detector and thereby provide increased dynamic range for the scanned imaging system.

It is an object of the present invention to increase the dynamic range of scanned imaging systems.

It is another object of the present invention to encode analog differences between scene pixel amplitudes.

These objects, together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention is a focal plane array which is intended to increase the dynamic range of scanned imaging systems.

Figure 1:
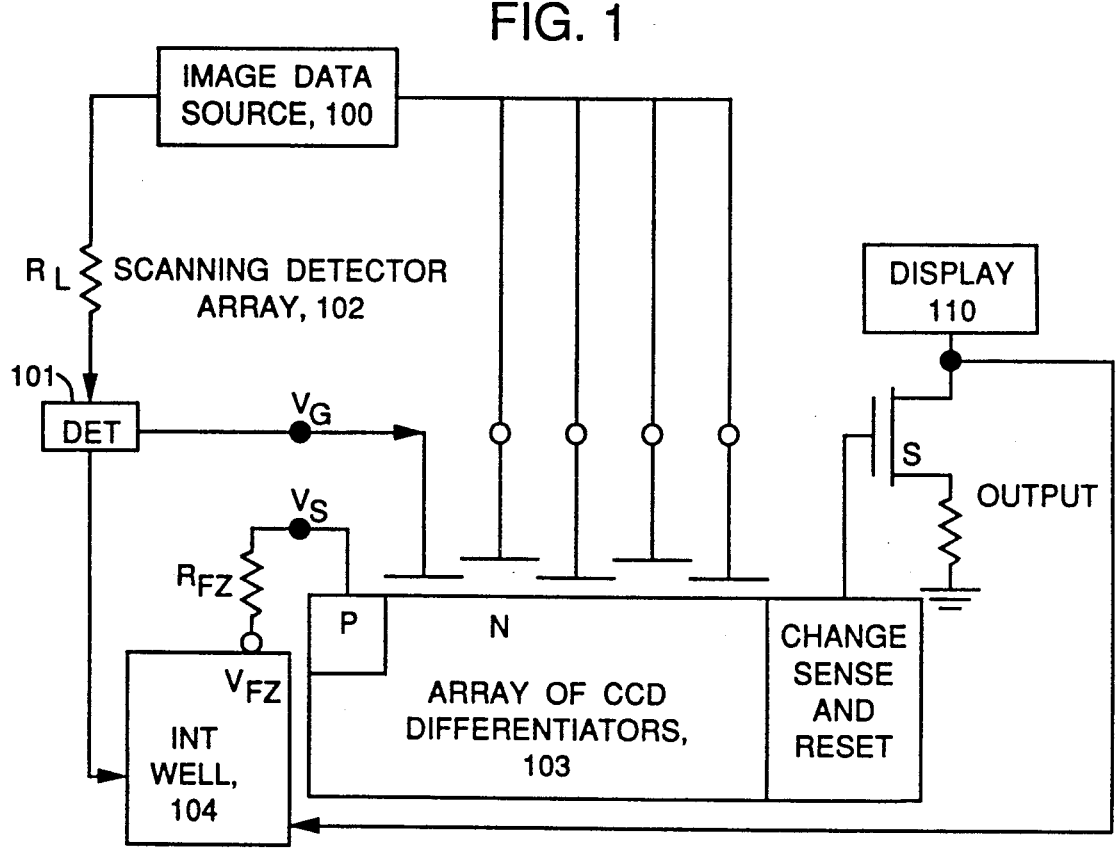
FIG. 1 is a schematic of an embodiment of the present invention.

The reader's attention is now directed towards FIG. 1, which is a schematic of an embodiment of the present invention. The embodiment of FIG. 1 comprises: a DC detector 101, an array of scanning detectors 102, an array of CCD differentiators 103, and an integrating well 104.

The DC detector 101 receives image signals from an image data source 100 of a scanned imaging system. The DC detector 101 produces an output signal that establishes the first pixel amplitude for the received digitized image.

The array of scanning detectors 102 also receives image signals from the image data source 100. The scanning detectors 102 in the array output a charge representing scene pixel amplitudes.

The array of CCD differentiators 103 receive a "fat zero" from the integrating well 104 and the output signals from the array of scanning detectors 102. The array of CCD differentiators 103 serves as a register which produces charge output signals which encodes the amplitude differences between pixels for each column. The charge output signals of the CCD differentiators is conducted to the integrating well (which produces therefrom the "fat zero") and to the display system 110 of the scanned imaging system.

The system of FIG. 1 provides a video image signal processing system which uses charge coupled devices in combination with a focal plane array to increase the dynamic image of a scanned imaging system. A charge coupled device (CCD) transfers data in the form of charge packets from an input at some rate controlled by clocking waveforms applied to the CCD electrodes. At the output, each charge packet manifests itself as a current pulse, which is normally converted to an output voltage in a subsequent circuit. In this subsequent circuit the output voltage is proportional to $Q_n/C_p$ (charge divided by output capacitance), and this voltage is reset to some reference $V_R$ after each cycle.

A CCD allows only unipolar signals (charge) to be applied and propagated through it, so any bipolar signals must be offset by some "fat zero" to make it unipolar. For many signal processing applications, it is desirable to reconstruct a true DC signal from the shifted output. Dark current generation which is a function of temperature, and the use of the clock rate, prevents one from simply subtracting out a known DC constant. Techniques which have been used to overcome this problem include, as mentioned above, the operation of 2 parallel CCDs, one with a (REF+SIGNAL) and the other with a (REF−SIGNAL), and subtracting the two voltage outputs.

The array of CCD differentiators 103 receives the "fat zero" ($Q_{FZ}$) from the integrating well 104, and the output signals from the array of scanning detectors ($\Delta Q$). As mentioned above, the array of CCD differentiators 103 serves as a register which produces charge output signals ($Q_R$) which equal $Q_{FZ} \pm \Delta Q$. The charge output signals encode the amplitude differences between pixels for each column and thereby provide increased dynamic range for the scanned imaging system.

The system of FIG. 1 services one column of an image frame from the image data source of a scanned imaging system. Each column of the image frame is served by an identical focal plane array to the one depicted in FIG. 1. Collectively, these systems provide increased dynamic range by outputting analog differences between scene pixel amplitudes for the display system 110.

As discussed in the Lampe et al reference, the focal plane arrays receive image signals from a variety of sensors which serve as the image data source. The Lampe et al reference uses an infrared (IR) sensor as an example. However, neither the Lampe et al system nor the present invention are limited to just an IR sensor as the image data source. A variety of video display systems are known in the art, and are suitable for use with the present invention. Such systems are deemed to be known in the art, and need not be described in detail here.

As the above-cited references (especially Lampe et al) indicate, the use of focal plane arrays is known in the art. The present invention is termed a "delta modulator focal plane array" due to the delta modulator circuit added to the focal plane detector array. The delta modulator, as described above, provides increased dynamic range by outputting analog differences between scene pixel amplitudes for the display system. The discussion presented below describes the testing of the delta modulator portion of the invention, and suggests proper reference voltages and values for the electrical components of a particular embodiment of the invention.

Figure 2:
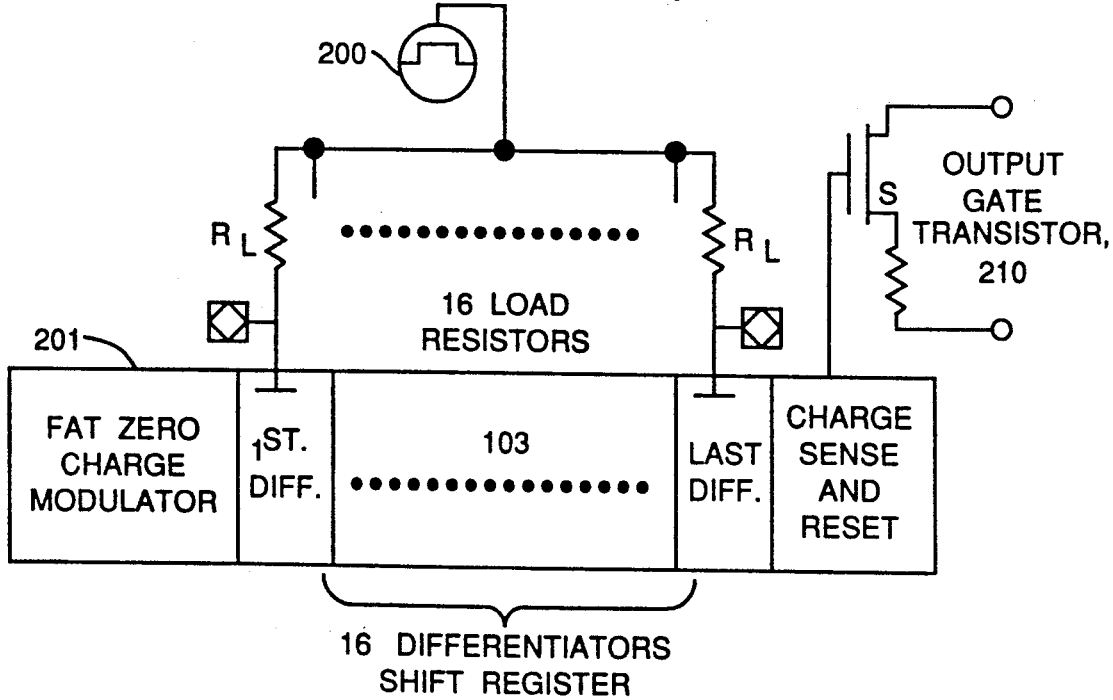
FIG. 2 is an illustration of the test configuration used to test the delta modulators of the present invention.

FIG. 2 is an illustration of the test configuration used on the delta modulator portion of the present invention. The delta modulator ($\Delta$MOD) 4×16 detector array is tested with electrical inputs operating with a 28 kHz shift register clock 200. A 50 percent fat zero charge is injected into the registers 103 via the charge modulator 201. This charge passes through all 16 differentiator cells and is modulated by adding or subtracting a charge from the fat zero charge, in proportion to the difference in applied voltage from the previous clock period to the present period. The difference in voltage changes the charge storage capacity of the charge well in the differentiator thereby creating a charge surplus or deficit in the well. This surplus or deficit, when combined with the fat zero charge coming into the well, adds to or subtracts from the fat zero charges in proportion to the change in applied voltage to the modulating gate.

Each of the detector cells may be evaluated by modulating the detector bus voltage bus which provides bias for all load resistors in the array with a 2 msec square wave as shown in FIG. 2. This method allows all 16 differentiators to be modulated and read out with a positive input and then, 2 msec later, they are read out with a negative input. The 2 msec rectangular modulating pulse, with outputs 2, 5 and 8 from wafer 1, die (1, 3) is shown in FIG. 2. The 16 positive pulses are followed 2 msec later by 16 negative pulses. Two blank bits between pulses are delay bits between modulating cells. Note that the detector spacing and size used requires the use of delay bits between differentiators. All 16 differentiators in the three registers are operating with less than 5 percent difference in gain. The transfer efficiency appears excellent, as indicated by a 400 microsecond pulse modulating the fat zero.

Figure 3:
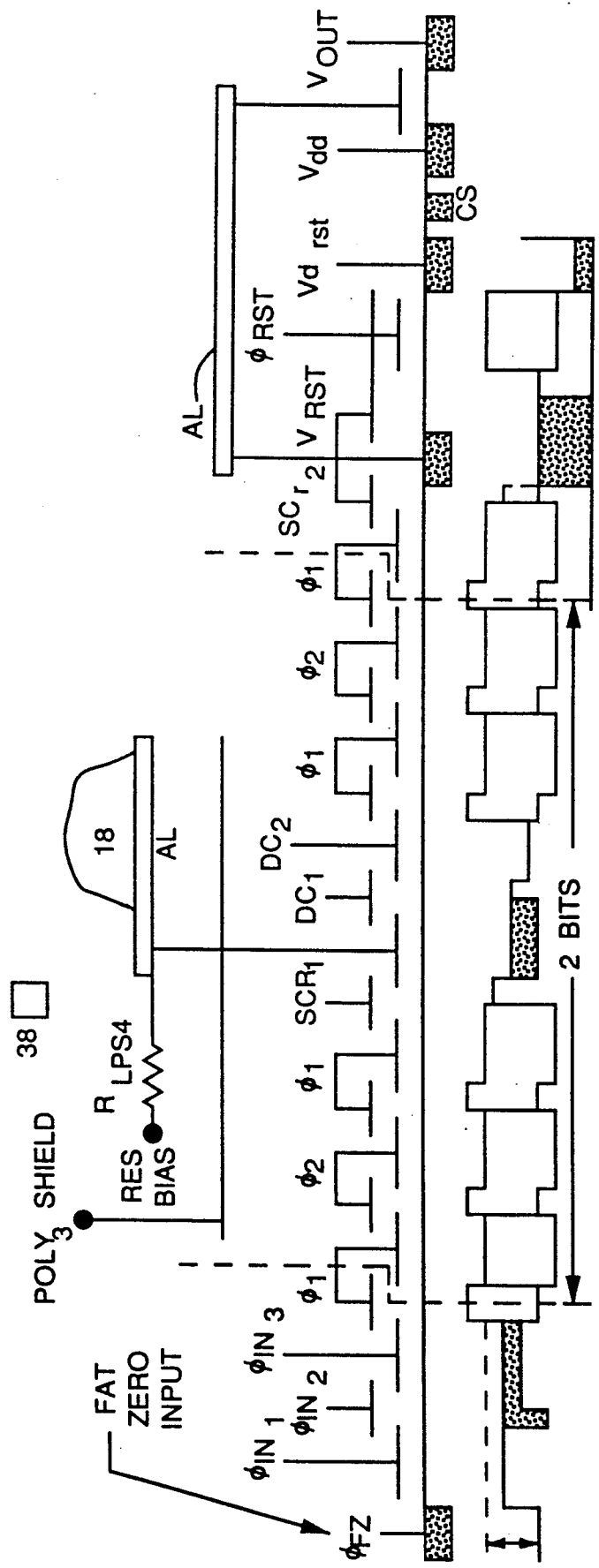
FIG. 3 is an illustration of a semiconductor construct which serves as the CCD differentiator in the present invention.

FIG. 3 is an illustration of a semiconductor system which serves as the array of CCD differentiators of an embodiment of the present invention. The purpose of FIG. 3 is to present an example of DC biases that are used in an embodiment of the present invention. The voltage values for these DC biases are listed next to their corresponding terminals below in Table 1.

TABLE 1

| DELTA MODULATOR DC BIASES | |
|---|---|
| Bias | Volts |
| Substrate | +3.8 |
| $\phi IN_1$ | −4.72 |
| $\phi IN_2$ | −20 |
| $\phi IN_3$ | −6.2 |
| $S_{CR1}$ | −4.5 |
| RES Bias | −15.0 (−0 to −22) |
| $D_{C1}$ | −13.5 |
| $D_{C2}$ | −9 |
| Poly Shield | −10 |
| $V_{RST}$ | −7 |
| $V_{dd}$ | −16 |

Figure 4:
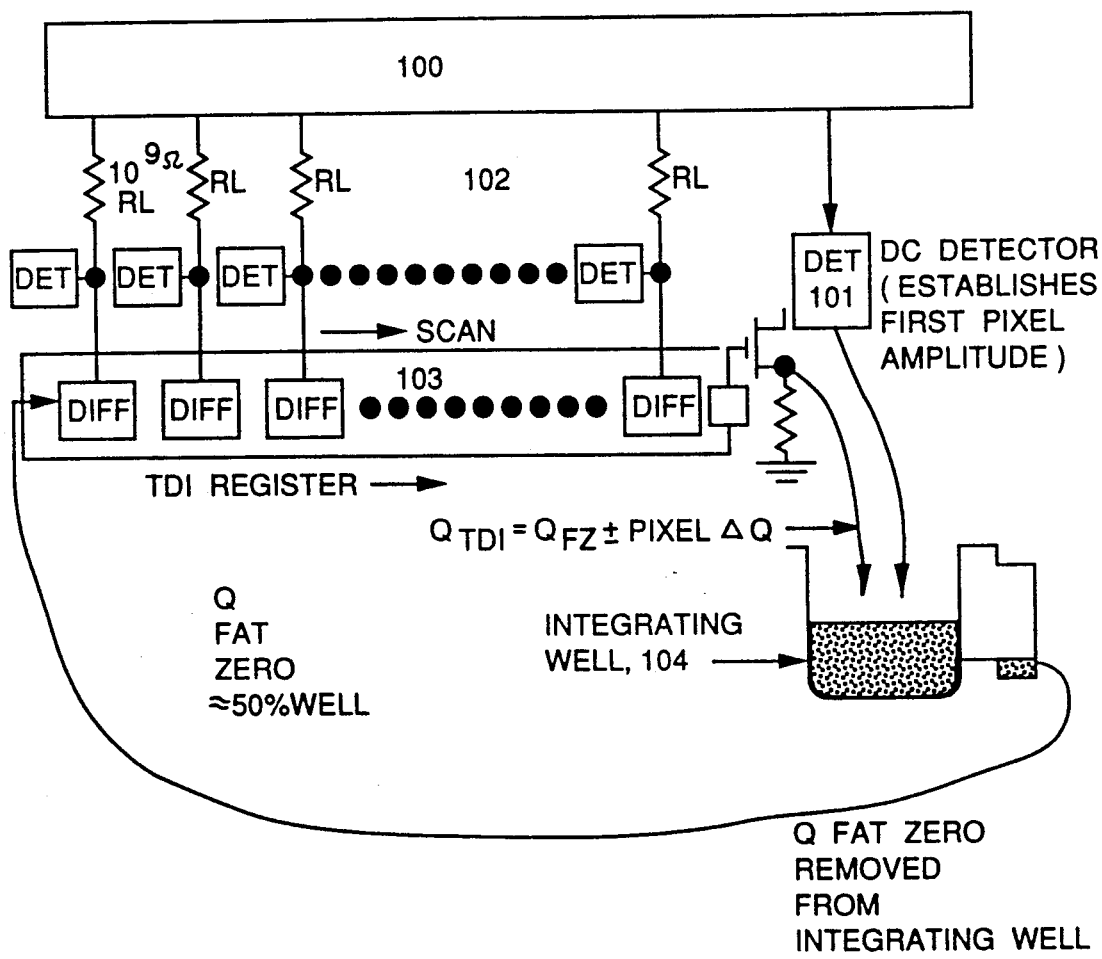
FIG. 4 is a functional block diagram of the preferred embodiment of the present invention.
Figure 4:
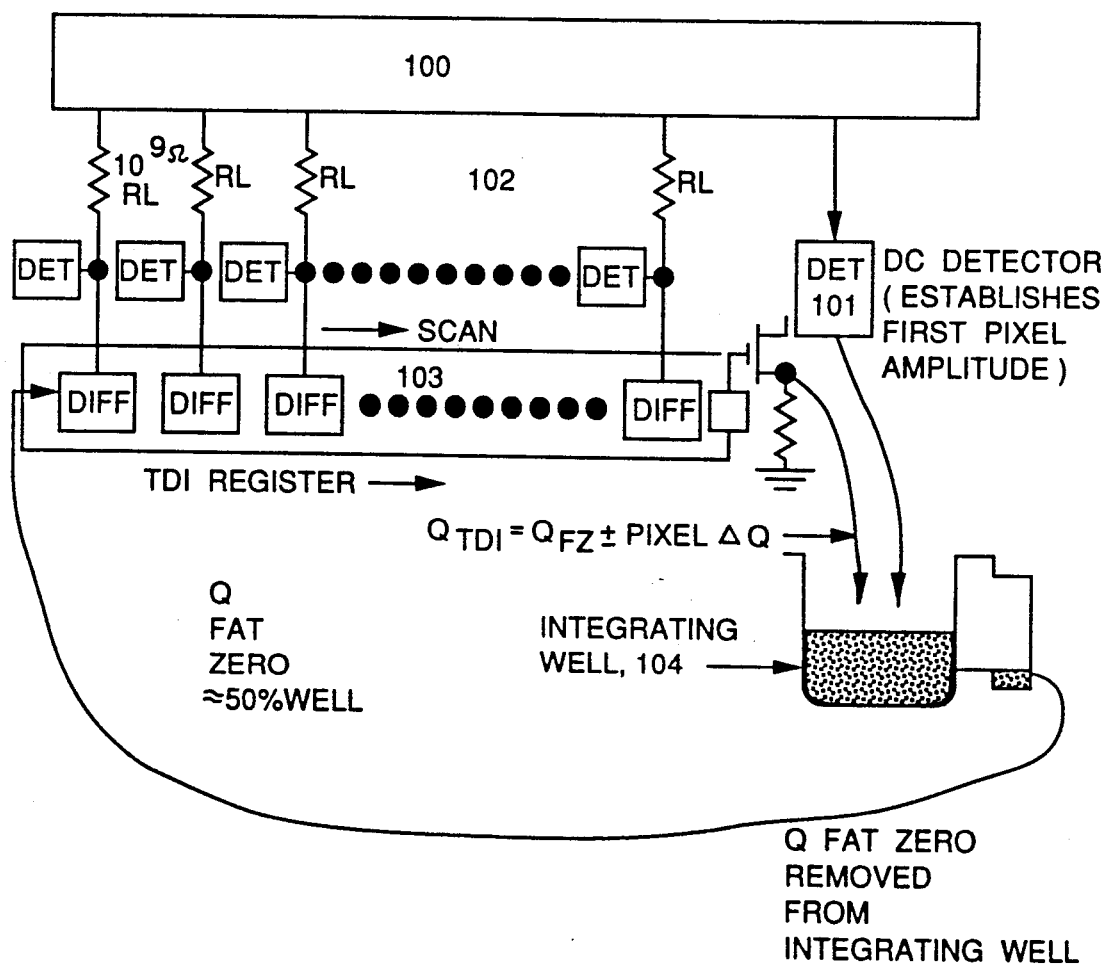

FIG. 4 is a functional block diagram of the preferred embodiment of the present invention. The purpose of FIG. 4 is to describe the interaction of the elements of the present invention as it receives image signals from an image data source, and outputs analog differences between scene pixel amplitudes to a display system to increase the dynamic range of a scanned imaging system.

In FIG. 4, both the DC detector 101 and the array of scanning detectors receive image signals from an image data source 100. The DC detector measures the signal it receives to establish a first pixel amplitude, as discussed above.

The array of scanning detectors 102 are a conventional focal plane, which produces a charge representing the actual scene pixel amplitudes of the image signals produced by the image data source 100. CCD focal plane arrays are known in the art and presented in the Lampe et al reference, and need not be described further here.

The array of CCD differentiators 103 receives a Q fat zero from the integrating well and subtracts it from the signals from the scanning detectors to output the analog difference between scene pixels to a display system 110. An excellent example of a CCD differentiator is given in the Petrosky reference, and need not be further described here. The point of FIG. 4 is that there should be a CCD differentiator for each detector in the array of scanning detectors 102.

The integrating well 104 receives the output signals of both the DC detector 101, and the array of scanning detectors and outputs therefrom a charge $Q_{FZ}$ which represents the fat zero that needs to be input into the array of scanning detectors 103. An excellent example of a current well is given in the above-cited Petrosky reference. Since such wells are known in the art, it need not be described in further detail here. In the example of FIG. 4, the charge of the fat zero ($Q_{FZ}$) was selected to be at a value of about 50 Δ of the charge received by the current well that serves as the integrating well 104.

The delta modulator focal plane of the present invention provides an increase in dynamic range by using an analog technique of encoding data through the TDI register. DC scene information, limited to 60 db in standard CCD focal plane arrays, is not transmitted through the differentiation register, and is therefore not limited by its dynamic range. The integration of the scene deltas and DC information allows transmission of much greater scene dynamic ranges (90–100 db are possible). The dynamic range of standard focal plane registers arrays are, as mentioned above, typically from 50 db–70 db.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A focal plane array for use with a scanned imaging system which has a source of video signals and a display system, said focal plane array comprising:
   a means for establishing a first pixel amplitude of said video signals, said establishing means receiving said video signals from said source, and outputting a first charge which is a measure of said first pixel amplitude, wherein said establishing means comprises a DC detector which establishes said first pixel amplitude by performing DC detection and measurement on said video signals received from said source;
   a means for detecting scene pixel amplitudes of the video signals from said source, said detecting means receiving said video signals from said source and outputting a plurality of second charges representing the scene pixel amplitudes of the video signals, wherein said detecting means comprises an array of scanning detectors which receives said video signals from said source, each of said scanning detectors outputting one of the plurality of second charges which represents a scene pixel amplitude of said video signals;
   a means for producing a third charge which represents a fat zero by integrating said first charge from said establishing means said fat zero being a quantity of charge which, when subtracted from the plurality of second charges, leaves a plurality of fourth charges which represent analog differences between scene pixel amplitudes; and
   a means for subtracting the fat zero from the plurality of second charges, said subtracting means subtracting the third charge, received from the producing means, from the plurality of second charges, received from the detecting means, to produce said plurality of fourth charges, said subtracting means outputting said plurality of fourth charges to said display system, said fourth charges representing said video signals with expanded dynamic range since they depict encoded analog differences between scene pixel amplitudes.

2. A focal plane array, as defined in claim 1, wherein said producing means comprises a current well which receives and integrates said first charge representing said first pixel amplitude from said establishing means, and said plurality of second charges from said detecting means to produce said third charge which represents said fat zero, said current well outputting said third charge to said subtracting means.

3. A focal plane array, as defined in claim 2, wherein said subtracting means comprises an array of CCD differentiators which produces said fourth charges by receiving and subtracting said third charge, received from said producing means, from each of said second charges, received from said detecting means.

* * * * *